No. 799,993. PATENTED SEPT. 19, 1905.
C. W. LEVALLEY.
CONVEYER.
APPLICATION FILED AUG. 22, 1904.
2 SHEETS—SHEET 1.
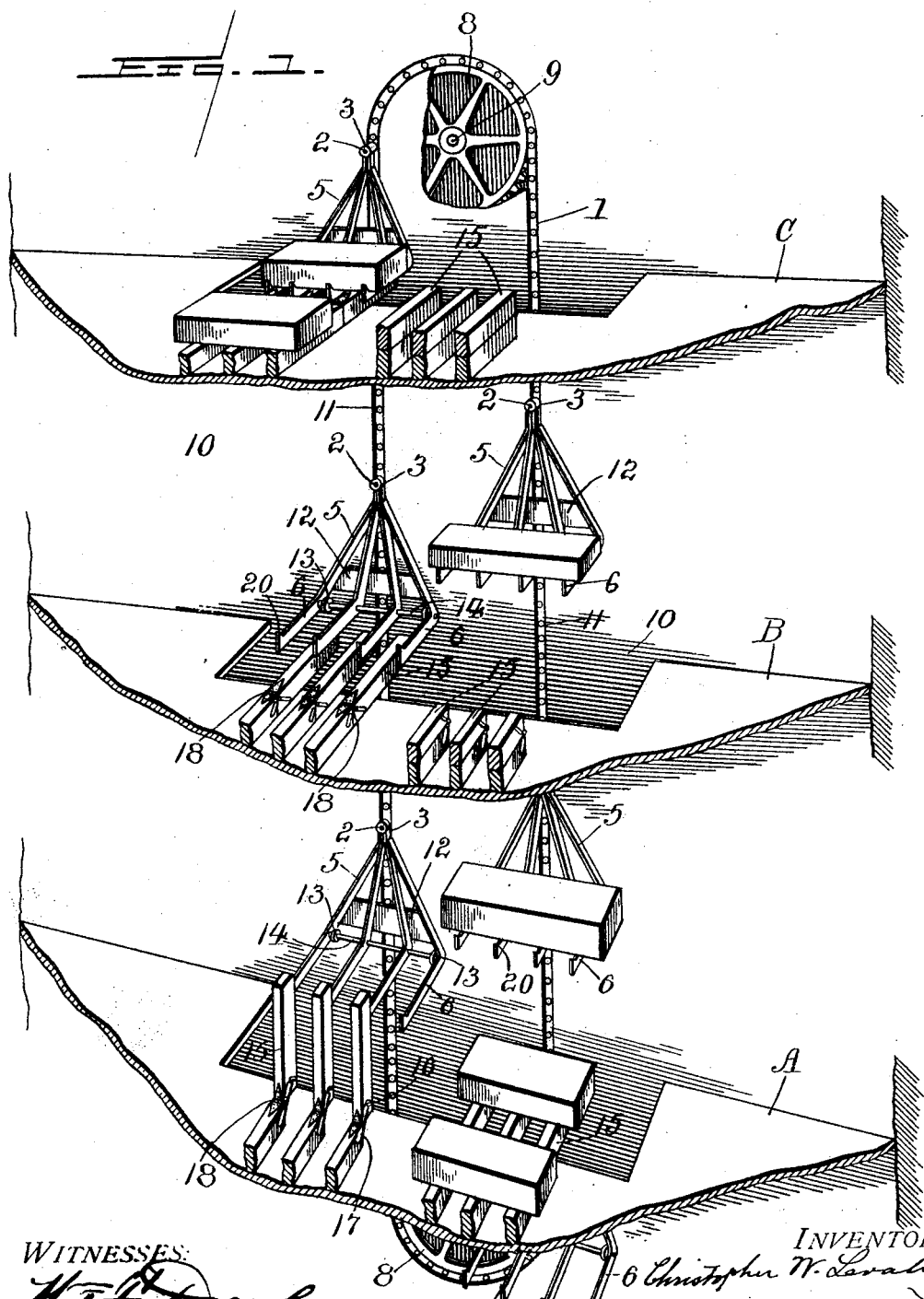

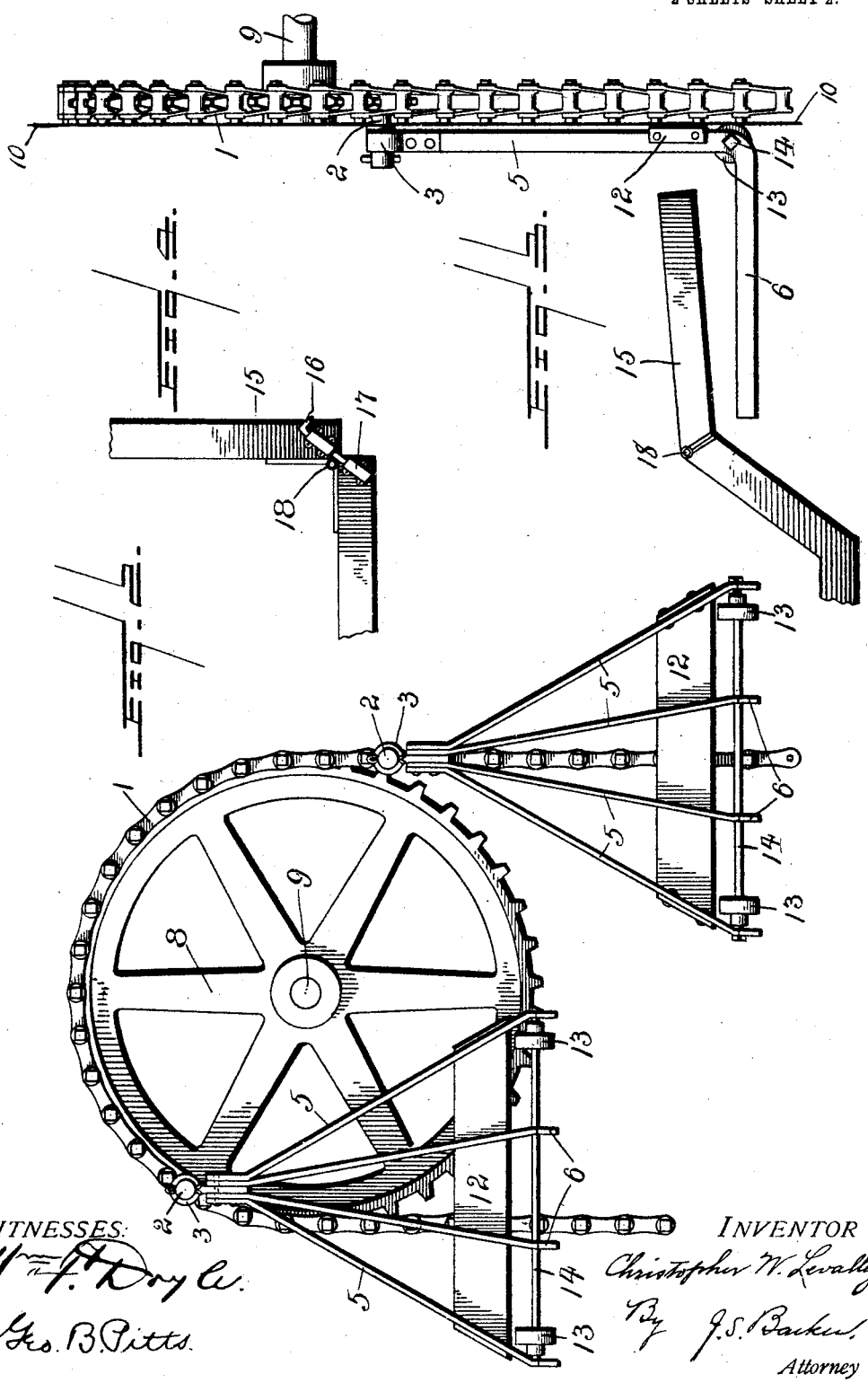

UNITED STATES PATENT OFFICE.

CHRISTOPHER W. LEVALLEY, OF MILWAUKEE, WISCONSIN.

CONVEYER.

No. 799,993.        Specification of Letters Patent.        Patented Sept. 19, 1905.

Application filed August 22, 1904. Serial No. 221,727.

*To all whom it may concern:*

Be it known that I, CHRISTOPHER W. LE-VALLEY, a citizen of the United States, residing at Milwaukee, in the county of Milwaukee and State of Wisconsin, have invented a new and useful Conveyer, of which the following is a specification.

My invention relates to endless conveyers, and is particularly adapted for elevating and conveying packages from one floor of a structure to another, although the invention is also applicable to conveyers the legs or runs of which travel in a more or less nearly horizontal direction.

It comprises, broadly stated, an endless chain or its equivalent, the sprocket-wheels or their equivalents, by which the endless chain is supported and driven, and a series of carriers or supports for the material to be conveyed connected with and carried by the endless chain. These parts are combined in a novel manner, as will be described and as is illustrated in the accompanying drawings, where the preferred form of my invention is shown.

Referring to such drawings, Figure 1 is a perspective view of an elevating-conveyer embodying my improvements. Fig. 2 is a front view of the upper part of the conveyer drawn on a larger scale than Fig. 1. Fig. 3 is a side view of the parts shown in Fig. 1, a different form of a loading and unloading platform from that shown in Fig. 1 being also represented. Fig. 4 is a detail view illustrating the means for holding one of the swinging platforms that is arranged adjacent to a hatchway in an open position.

In the elevating-conveyer represented in the drawings I employ but a single endless chain 1, which is formed of a series of links that may be of any usual or preferred construction. The chain passes over and is supported by the sprocket-wheels 8, arranged, respectively, at the head and foot of the conveyer and mounted upon suitable shafts 9, one of which is connected with the driving mechanism. Such mechanism is not shown in the drawings, as it forms no part of the present invention. It may be arranged to drive the conveyer in one direction only or to drive it in either direction, as may be desired, as a conveyer embodying my invention such as I have shown is adapted to travel in either direction. To this endless chain is secured a series of carriers or supports for the material to be transported. I have represented these carriers as being of skeleton shape and adapted to transport boxes or packages; but their shape and construction may be modified to suit the character of the material being handled. Thus, for instance, if barrels or cylindrical packages were being handled the outer edge of each carrier would be turned upward, as indicated at 20, in order to hold the barrels or packages from rolling off. At suitable intervals along the chain there are inserted special links provided with laterally-projecting studs or journals 2, upon which are supported the carriers. As represented in the drawings, each carrier is formed of a series of bars shaped to form a substantially horizontal support 6 for the packages and the series of converging suspension-bars 5, connected at their upper ends with the bearing 3, that encircles the stud or journal 2 of the special link. The carrier is strengthened by a cross-plate 12, that is attached to and serves to unite the bars 5. A cross shaft or rod 14 is arranged near the lower rear edge of the carrier, and upon it are mounted the rollers or wheels 13, to be hereinafter more particularly referred to.

I have represented the conveyer as arranged in a structure having three floors A B C, through openings or hatchways in which the carriers move as they pass up and down. These openings are adapted to be closed by swinging platforms 15, each formed of a series of bars spaced apart so as to allow the bars of the carriers to pass freely between them and yet to pick up such articles as may be placed thereupon. The platforms are preferably hinged, as indicated at 18, so they may be swung back to entirely uncover the hatchways. A platform may be held in an upright position by means of a bolt and socket 16 and 17, in which position it will serve as a gate to guard the opening, as indicated at the floor A, or it may be thrown entirely back, as indicated at the floor C.

The conveyer is preferably arranged adjacent to a wall 10 of the structure, and I perfer that the wheels 8 should be arranged inside such wall, so as to be protected and concealed thereby, and that the chain should travel in a groove or way 11 in the wall, the outer edge of the chain being substantially flush with the face of the wall. This way consists of two parts, one for each leg or run of the conveyer. Thus the up-moving run is situated in one recess or groove and the down-moving leg or run in another groove.

These may be, as represented in Fig. 1, connected to form a single way. When thus arranged, the conveyer is protected and out of the way, and danger of any article being caught thereby is largely reduced. It will be seen that the carriers for the material to be transported are freely swinging and mounted upon axes that are parallel with the joints of the chain and transverse to the plane in which the chain moves. The wall or partition 10 serves as a bearing against which the carrier rests when loaded, and the wheels or rollers 13 by resting against such wall largely reduce the friction of the carriers therewith.

If a loaded carrier should encounter any one of the platforms 15 no damage would result, as such platform would be lifted and the carrier and its load allowed to pass on, after which the platform would immediately fall back to place. If any carrier should fail to be unloaded at the proper place, no damage would result, as it would merely pass the head-wheel and travel down the descending leg of the conveyer. If the hatchways through the several floors were open, the load would remain upon the carrier until removed; but if any one of the platforms 15 on the descending side of the elevator should be down, covering such hatchway, the load would be automatically deposited thereupon. I thus provide for automatically unloading the conveyer.

While in Fig. 1 I have represented each platform as being level with the floor, it is evident that it might be arranged at a higher level, as shown in Fig. 3, and this arrangement is sometimes of advantage in loading and unloading, as it allows the platform to be inclined, so that an article deposited thereupon will roll or slide off and be out of the way of the next article to be delivered.

By the use of my invention I am enabled to make a thoroughly-practical conveyer in which but a single line of chain or its equivalent is employed, and by arranging the carriers entirely to one side of the chain the latter may be mounted within the wall-space of the structure, leaving only the carriers exposed.

Having described my invention, what I claim is—

1. The combination of a flat wall in which are formed vertically-disposed ways or grooves, an endless chain mounted within the said grooves and arranged to move in planes parallel with the face of the wall, and carriers pivotally connected with the chain and arranged to bear against the face of the said wall on either side of the grooves, the said wall extending in either direction beyond each groove a distance greater than half the width of the carriers, substantially as set forth.

2. The combination of an endless-conveyer chain, and a series of swinging load-carriers pivotally connected therewith, each load-carrier being formed of a series of bars shaped to form horizontally-disposed supports, 6, and a series of suspension members, 5, that converge toward the pivotal connection of the carrier with the chain, substantially as set forth.

3. In a conveyer, the combination of an endless chain, and a series of swinging load-carriers connected therewith by pivots or joints, the load-carriers being formed of bars shaped to constitute a series of load-supporting fingers or bars, 6, and a series of converging suspension members, 5, a strengthening cross-piece uniting the said bars, and the rollers, 13, supported near the outer edges of the carriers and substantially in the planes occupied by the suspension members of the carriers, substantially as set forth.

4. The combination of an endless conveyer, upper and lower supporting-wheels for such conveyer, a series of swinging carriers for the material to be transported secured to the endless conveyer, and arranged to freely pass when loaded the supporting-wheels of the endless conveyer, and a series of loading and unloading platforms arranged adjacent to the oppositely-moving legs of the conveyer, all of such platforms being disposed at one side of the path of movement of the conveyer, and arranged to permit the free passage of unloaded carriers and being hinged to permit the passage of a loaded carrier on the up-moving leg of the conveyer, but to remove the load from a carrier on the down-moving leg of the conveyer, substantially as set forth.

CHRISTOPHER W. LEVALLEY.

Witnesses:
W. C. SARGENT,
V. I. KLOFANDA.